UNITED STATES PATENT OFFICE.

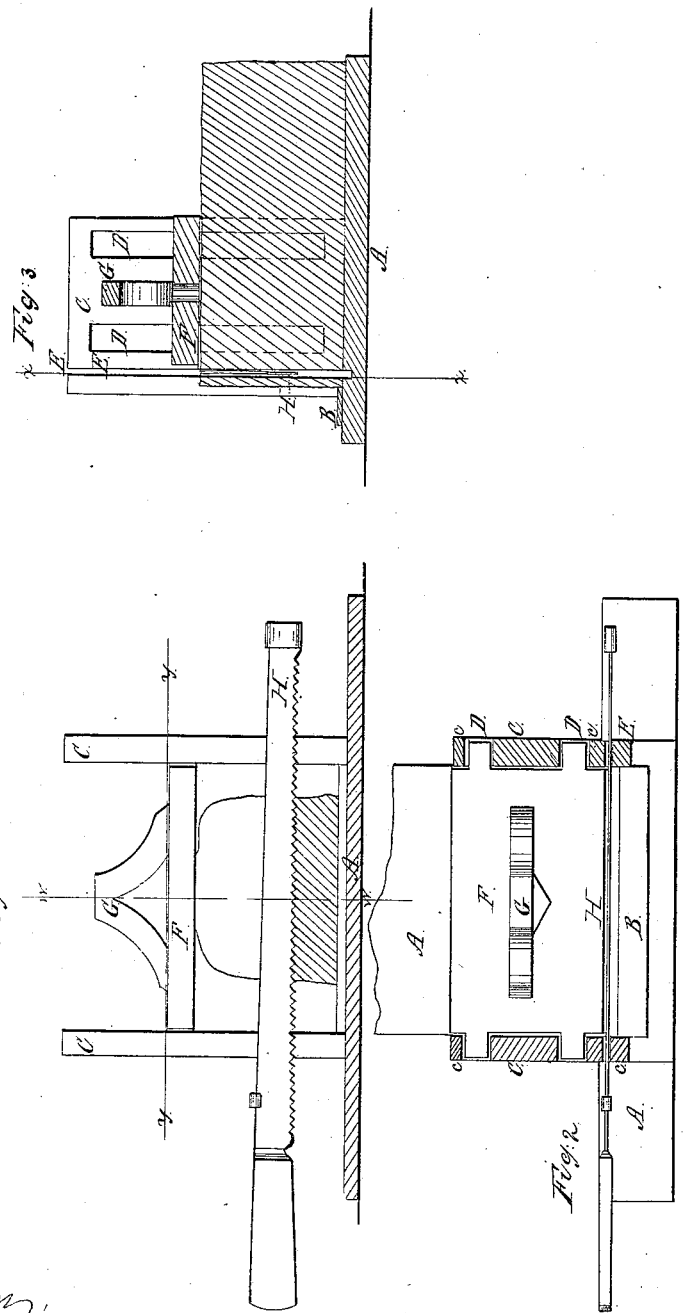

SOLOMON KEPNER, OF POTTSTOWN, PENNSYLVANIA.

IMPROVED BREAD AND MEAT CUTTER.

Specification forming part of Letters Patent No. 53,835, dated April 10, 1866.

*To all whom it may concern:*

Be it known that I, S. KEPNER, of Pottstown, in the county of Montgomery and State of Pennsylvania, have invented a new and useful Improvement in Bread and Meat Cutters; and I do hereby declare that the following is a full, clear, and exact description thereof, which will enable others skilled in the art to make and use the same, reference being had to the accompanying drawings, forming part of this specification, in which—

Figure 1 is a longitudinal section of my improved cutter through the line $x\,x$, Fig. 3. Fig. 2 is a horizontal section through the line $y\,y$, Fig. 1. Fig. 3 is a vertical cross-section through the line $w\,w$, Fig. 1.

Similar letters of reference indicate like parts.

The object of my invention is to furnish an instrument by means of which bread and meat can be cut into slices; and it consists in combining a saw-edged knife with a frame and guide, and in combining a holder with a frame and knife, as hereinafter more fully described.

A is the bottom of the frame or platform upon which the article to be cut is placed. This platform should extend back beyond the rear of the frame far enough to fully support the said article, and it should also extend a little in front of said frame. It should also be grooved or channeled between the knife-grooves in the side pieces of the frame, so that the knife may cut entirely through the article to be cut without marring the surface of said platform. Upon the platform, in front of the knife-groove and at a distance from it equal to the thickness of the required slice, may be placed a guide, B, to stop the advance of the article to be cut as it is pushed forward to cut another slice.

C are the side pieces of the frame, which are attached to the platform A and extend up to a convenient height. In these side pieces, C, are grooves D and E, as shown in the drawings. The grooves D may or may not extend out through the top of the sides C; but the groove E should.

F is a holder for holding the article while being sliced, and has projecting tongues which fit into the grooves D and guide the holder as it is moved up and down, and also prevent the holder from slipping so far forward as to get into a line with the grooves E and be marred by the knife. The holder F is moved up and down by means of the handle G.

H is a saw-edged knife which works in the grooves E. The knife in the drawings is represented as having a saw-toothed edge; but for some purposes a smooth-edged knife may be preferable.

In using the apparatus the holder F is raised and the article placed beneath it and pushed forward so that it shall project beyond the grooves E a distance equal to the thickness of the required slice. It is then held in that position by gently pressing upon it with the holder F, and the slice is cut by passing the knife down through the grooves E, as represented in the drawings.

I claim as new and desire to secure by Letters Patent—

The combination of the holder F with the frame C and knife H, substantially as described, and for the purpose set forth.

SOLOMON KEPNER.

Witnesses:
C. E. LONGABAUGH,
JNO. S. WEILER.